United States Patent [19]

Picciotto

[11] 4,171,573
[45] Oct. 23, 1979

[54] CROPPING GUIDE

[76] Inventor: Anthony Picciotto, 1212 NW. Morland Ave., Los Angeles, Calif. 90027

[21] Appl. No.: 935,932

[22] Filed: Aug. 23, 1978

[51] Int. Cl.² ............................................... B43L 5/00
[52] U.S. Cl. .................................. 33/1 B; 33/DIG. 9; 33/476
[58] Field of Search .................. 33/1 C, DIG. 9, 1 B, 33/95, 104; 355/125, 126, 133

[56] References Cited

U.S. PATENT DOCUMENTS

| 1,330,069 | 2/1920 | Fischacher | 33/DIG. 9 |
| 2,123,674 | 7/1938 | Gottlieb | 33/DIG. 9 |
| 2,403,614 | 7/1946 | Ross | 33/DIG. 9 |

Primary Examiner—Harry N. Haroian
Attorney, Agent, or Firm—McAulay, Fields, Fisher & Goldstein

[57] ABSTRACT

A cropping guide especially for drawing a proportioned field for use in audio/visual work has three straight edge marking device guides, each with an index associated therewith. The first and second straight edges define a right angle therebetween and the third edge defines a bisector of the right angle to form an angle with the first edge having a cotangent equal to the ratio of the field to be drawn using the cropping guide. The ratio of the index on the first edge to the corresponding index on the second edge is also the same as the field ratio. The index on the third edge is defined by the projection thereon along a line parallel to the first edge, of the index on the second edge.

7 Claims, 3 Drawing Figures

CROPPING GUIDE

BACKGROUND OF THE INVENTION

A field, as used in this application and in the audio/-visual arts in general, is a frame or guide drawn around a two-dimensional display which is to be photographed, to aid the photographer in lining up his camera. The guide may be drawn directly around the display or, more usually, on a piece of tissue paper attached over the display. The ratio of the width to length of the frame is determined by the ratio of the width to the length of the photographic material on which the display is to be reproduced.

In photographing the exhibit the photographer need only use the frame as a guide in his previewing device to see what will finally result on his negative. In addition, the person setting up the display can control the cropping of the exhibit, or at least be aware of that cropping which will occur by reason of the photographic material format or size being used to reproduce the exhibit.

There are a number of ways in which a field of proper width to length ratio is drawn. However, these methods are generally quite cumbersome. For example, one method utilizes a T-square and triangle; a second method uses a relatively expensive and cumbersome L-device known as a scalograph, while a third method utilizes a sheet of acetate on which are predrawn a number of fields which can be traced.

Basically the T-square and triangle method requires drawing arbitrary upper and lower horizontal lines plus one arbitrary vertical line and thereafter measuring ratios on these lines. A diagonal is drawn and the proper ratio marked thereon to be used as a guide for drawing the field.

The double L-device or scalograph is basically two angle guides connected together by a diagonal which keeps them aligned properly.

The third method, the use of a solid acetate sheet with predrawn fields, requires that one lay the sheet over the exhibit to be cropped and lay a piece of tissue paper over the sheet. The appropriate field most closely approximating the desired cropping outline is then traced onto the tissue paper.

The usual methods employed for forming a field suffer from a number of disadvantages. The T-square and triangle method, although reasonably accurate, requires a great deal of careful work to obtain proper results. The scalograph is relatively expensive and not very accurate or precise in operation. The use of a sheet of acetate with predawn fields, although relatively inexpensive, is also relatively inaccurate in that it requires a step wherein someone will need to trace a field onto a sheet of tissue and also requires a determination as to which field is closest to that which is desired.

It is an object of the present invention to provide a cropping guide which, although relatively inexpensive to manufacture and simple to operate, is accurate and precise.

It is a further object to provide a cropping guide which can be used to draw a field having a certain ratio as to its width to length, but of any required absolute size.

It is a still further object of the invention to provide a cropping guide which will allow quick and simple determination of the center of the field being drawn.

Other objects will be brought out below or will be obvious therefrom.

BRIEF DESCRIPTION OF THE DISCLOSURE

The objects of this invention are accomplished by providing a cropping guide having three indexed straight edges. A first and second of said straight edges are disposed at right angles to each other. The third straight edge defines a bisector of the right angle between the other two edges and forms an angle, the cotangent of which angle is equal to the ratio of the length of the sides of the field which it is desired to draw. Similarly, the ratio of the index on the first arm to the corresponding index on the second arm is the same as the ratio of the length of the sides of the field which it is desired to draw. The index on the third straight edge is defined by the projection thereon of the index on the second edge.

It is preferable to have one of the indices in intervals which can be related to a usual linear measuring system such as inches or centimeters. This facilitates drawing a field of a particular size when the size is known in terms of inches or centimeters.

In use, it is the first edge which has an index related to, for example, inches. Once the width of the field is chosen, the rest of the field is predetermined by the ratio for which the particular cropping guide was designed.

DESCRIPTION OF THE PREFERRED EMBODIMENT

Figure 1:
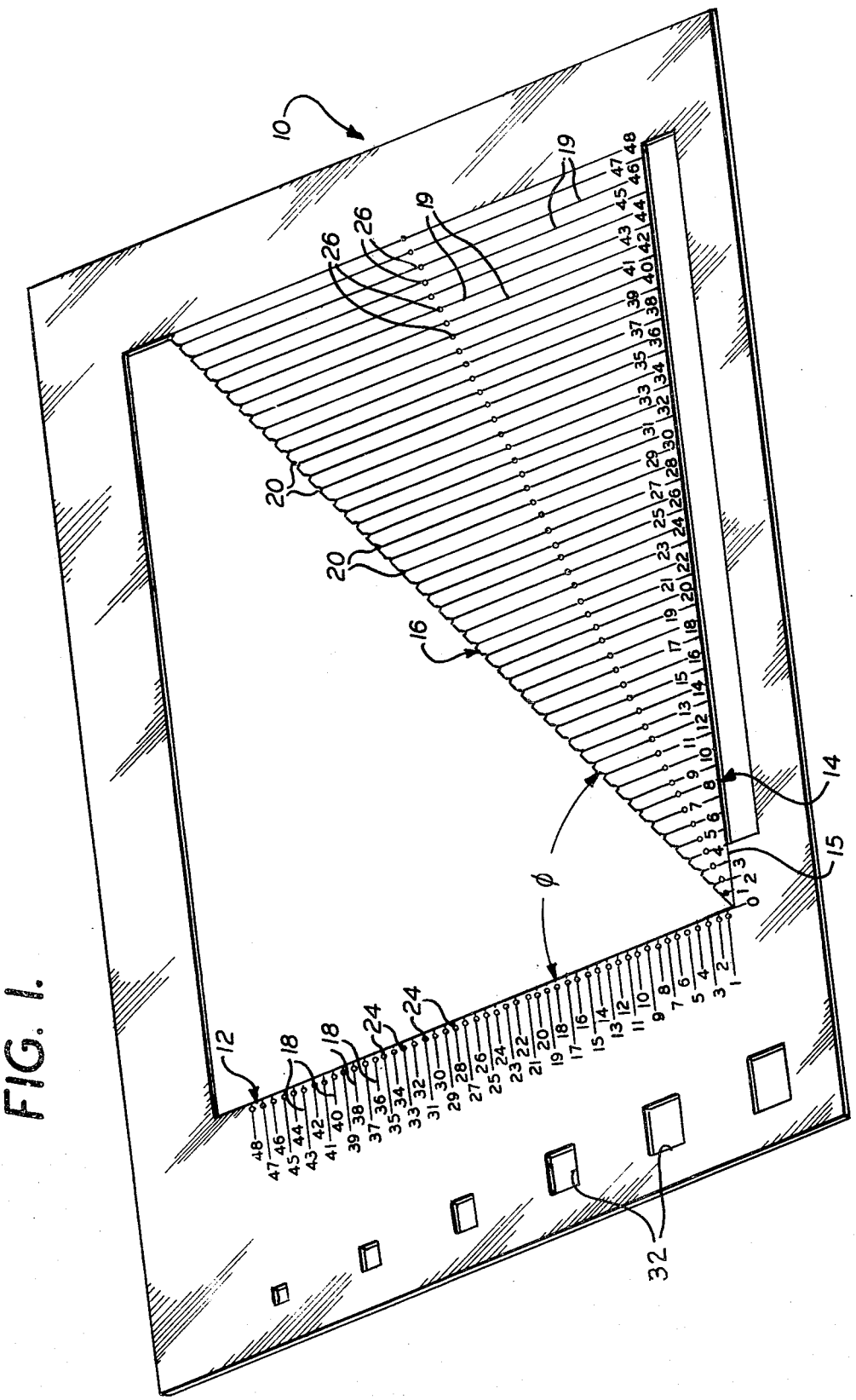
FIG. 1 is a perspective view of a cropping guide template, according to the present invention.

With reference to FIG. 1, a cropping guide in the form of a template 10 has a first indexed straight edge 12, a second indexed straight edge 14 and a third indexed straight edge 16.

Indexing is accomplished by use of numbered marks or lines 18, 19 along each straight edge.

As can be seen in the drawing, a projection 15 of the second indexed straight edge 14 intersects a projection or the lower end of the first indexed straight edge at right angles. The third indexed straight edge 16 bisects the right angle to form an angle $\phi$ with the first indexed straight edge 12. The cotangent of $\phi$ is equal to the ratio of the width to length of the field which the cropping guide is intended to be used to draw. Additionally, the relationship between the spacing of the index on the first straight edge to the index on the second straight edge is in the same ratio, that is the ratio of the width to length of the field. The indexing on the third straight edge 16 is defined by the projection of the indexing from the second straight edge 14 along a line parallel to the first straight edge 12 onto the third straight edge 16.

To make measurements more precise, it is preferable to form open sockets 20 along the third straight edge 16 at the intersection of this straight edge 16 with the index mark lines 19. A marking device 22 (shown schematically in FIG. 2) will be received in these sockets to reduce human error in making the position of the index on the third straight edge 16. As the first and second straight edges (12, 14) are used to draw lines, open sockets along these edges (12, 14) cannot be utilized as this will result in a scalloped line rather than a straight line. This is undesirable from an esthetic point of view as well as because it will cause increased wear of the marking device and the cropping guide as the marking device moves along the scalloped straight edge guide. To avoid this problem, orifices 24, 26 such as pin holes, through which a sharpened marking device 22, such as a pencil, can be pushed and thereby, guided to place a precisely located mark, are formed through the cropping guide 10. These orifices 24, 26 precisely locate the length and the width of the field as will be detailed below. Orifices 26 on the index lines 19 may be formed half-way between the second and third index lines 14, 16 to aid in drawing a target 28.

In order to facilitate drawing small fields, a number of appropriate and variously sized rectangular openings 32, can be formed in the cropping guide 10. The ratio of the sides of the openings corresponds to the ratio of the field which the particular cropping guide 10 is designed to draw. These rectangular openings are particularly useful fo the embodiment shown in FIG. 1 as the second straight edge 14 does not extend to zero. Thus, the use of the rectangular opening 32 will fill the gap in field sizes that can be conveniently drawn and the range of sizes of the rectangular openings need only cover the gap between the zero point and the end of the second straight edge 14.

OPERATION OF THE DEVICE

The operation or use of the cropping device 10 will be described as a series of steps. As will be obvious, most of the steps can be accomplished in any order.

1. The cropping guide 10 is placed over the exhibit 20 for which a field 30 is to be drawn.

Figure 2:
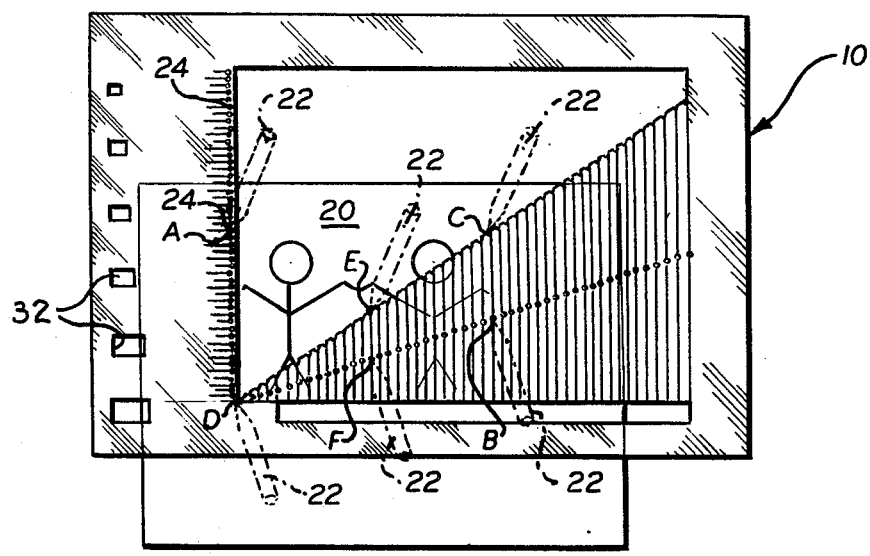
FIG. 2 illustrates the cropping guide of FIG. 1 in use preparing a field.

2(a). Point A is chosen with respect to the width of the desired field and located by pushing the marking point of a marking device 22 through an appropriate orifice 24 as shown in FIG. 2. Points B and C are similarly made with the aid of socket 20 and orifice 22 on the index 19 corresponding to the index locating point A. Point D is the apex of angle $\phi$.

Figure 3:
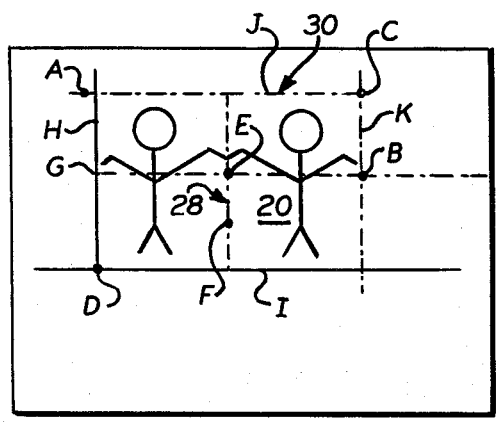
FIG. 3 illustrates a field drawn utilizing the cropping guide of FIG. 1.

2(b) (i). If a target is to be drawn, points E and F are located with a marking device 22. These points are on the index 19 which is half-way between the first straight edge 12 and the index along which points B and C are located. Point E is the center of the field and can be used to draw target 28 with point B or point F as shown in FIG. 3.

2(b) (ii). Alternatively, if a target is to be drawn and the cropping guide used is an embodiment wherein orifices 26 are not in the center of their respective index lines 19, a point G, located half-way to point A can be used in place of point B for drawing the horizontal target line.

3. Before moving the template, a vertical line H is drawn along the first straight edge 12; and a portion of horizontal line I is drawn along the second straight edge 14. 4. Using a straight edge, such as is provided by the cropping guide 10 at various places, the field 30 is completed by extending line I through point D; drawing a second horizontal line J between points A and C; and drawing an extended second vertical line K through points B and C to cross horizontal line I.

As is clear from the disclosure above, a template formed as a cropping guide according to the present invention can be designed for any width to length field porportion that it is desired to draw. The particular field for which the guide is designed will depend, as noted above, on the final use to which the field is to be put.

For example, a 3×4 format would be primarily used in the motion picture industry, as this reflects the size of the usual film and videotape format used in that field. An 8½×11 format will find most frequent use in applications where artwork is to be printed on paper. Obviously, as the various formats used in the audiovisual field change, a guide can be formed to reflect the new format, such as one based in the metric system.

The above is intended by way of illustration of a presently preferred embodiment of the invention. It is to be understood that the invention is not to be restricted to the exact details of coverage shown and described above, as other embodiments will be obvious to a person of ordinary skill in the art. The exact details of the manner in which the present invention is embodied can, of course, be subject to a great deal of variation and it is therefore intended that the present invention be limited only by the claims as follows.

What is claimed is:

1. A cropping guide for drawing a field having a predetermined ratio of width to length, comprising: a flat element having;
    first, second and third straight edges having first, second and third calibrations, respectively, said element being in the form of a template wherein said first and said third straight edges form a side and a hypotenuse of a triangle which is cut out of said template, said second straight edge being one side of a rectangular slot cut from said template,
    said first edge determining the width of the field,
    said second edge defining a right angle with said first edge and determining the length of the field,
    said third edge bisecting said right angle to define a second angle with said first edge, the cotangent of said second angle being equal to said predetermined ratio,
    said first and second calibrations being in said predetermined ratio with respect to each other,
    said third calibrations being defined by the intersection of the projection of said second calibrations on said third straight edge along a projection parallel to said first straight edge.

2. The cropping guide of claim 1 and wherein said calibrations comprising a series of numbered lines printed on said template.

3. The cropping guide of claim 2 wherein the numbered lines forming said second calibrations are extended to form said third calibrations; and further including
    an orifice formed through at least some of said extended lines, operable to guide a marking device through said template.

4. The cropping guide of claim 2 wherein said first calibrations further comprising orifices formed through at least some of the numbered lines forming said first calibrations and being operable to guide a marking device through said template.

5. The cropping guide of claim 2, 3 or 4 wherein said third calibrations comprises open sockets formed along said third straight edge to receive, and thereby guide, a marking device.

6. The cropping guide of claim 3 wherein each said orifice is disposed in the center of said extended second calibrations.

7. The cropping guide of claim 1 or 2 further including a plurality of rectangular guides having sides in said predetermined ratio and being of various sizes up to a predetermined maximum size.

* * * * *